(12) United States Patent
Kringstad

(10) Patent No.: US 12,221,300 B2
(45) Date of Patent: Feb. 11, 2025

(54) CLEANUP CONVEYOR SYSTEM

(71) Applicant: Kringstad Ironworks, Inc., Park River, ND (US)

(72) Inventor: Burnell R. Kringstad, Park River, ND (US)

(73) Assignee: Kringstad Ironworks, Inc., Park River, ND (US)

( * ) Notice: Subject to any disclaimer, the term of this patent is extended or adjusted under 35 U.S.C. 154(b) by 183 days.

(21) Appl. No.: 17/954,939

(22) Filed: Sep. 28, 2022

(65) Prior Publication Data

US 2024/0101365 A1 Mar. 28, 2024

(51) Int. Cl.
*B65G 67/08* (2006.01)

(52) U.S. Cl.
CPC .................................. B65G 67/08 (2013.01)

(58) Field of Classification Search
None
See application file for complete search history.

(56) References Cited

U.S. PATENT DOCUMENTS

| | | |
|---|---|---|
| 984,740 A | 2/1911 | Beall |
| 1,415,191 A | 5/1922 | Parks |
| 1,438,673 A | 12/1922 | Trescott |
| 1,609,442 A | 12/1926 | Thompson |
| 2,997,086 A | 8/1961 | Armer |
| 3,348,680 A | 10/1967 | Mathews |
| 3,429,438 A | 2/1969 | Palmen |
| 3,593,719 A | 7/1971 | Ashton |
| 3,613,796 A * | 10/1971 | Cayton ............... A01D 45/006 171/27 |
| 3,628,609 A | 12/1971 | Graybill |
| 3,854,585 A | 12/1974 | Herkes |
| 4,861,461 A | 8/1989 | Utterback |
| 5,183,160 A | 2/1993 | McClain |
| 5,234,564 A | 8/1993 | Smith |
| 5,261,171 A | 11/1993 | Bishop |
| 5,860,533 A | 1/1999 | Wood |
| 6,298,644 B1 | 10/2001 | Sandei |
| 6,460,706 B1 | 10/2002 | Davis |
| 6,843,376 B2 | 1/2005 | Dube |
| 6,877,610 B2 | 4/2005 | Boast |
| 7,921,628 B2 | 4/2011 | Meester |
| 9,078,397 B2 | 7/2015 | Farley |

(Continued)

OTHER PUBLICATIONS https://www.schmidt-agrarhandel.com/images/pdf_dokumente/jabelmann/sortieranlagen/bandsortierer_krukowiak_m_649.pdf; Schmidt Agrarhandel Gmbh Website—Euro-Jabelmann EURO-Sorter M-649 Brochure PDF; Before Nov. 21, 2017.

(Continued)

*Primary Examiner* — Kavel Singh
(74) *Attorney, Agent, or Firm* — Neustel Law Offices

(57) ABSTRACT

A conveyor for transferring debris that falls from an end dump conveyor to a main incline conveyor. A cleanup conveyor is attached to an end dump conveyor of a crop piler. The upper run of the cleanup conveyor is positioned below a lower run of the end dump conveyor and is adapted to receive debris that falls from the lower run of the end dump conveyor. The outer end of the cleanup conveyor is near a main incline conveyor of the crop piler to transfer the debris that falls from the lower run of the end dump conveyor to the main incline conveyor of the crop piler.

19 Claims, 16 Drawing Sheets

(56) References Cited

U.S. PATENT DOCUMENTS

| | | |
|---|---|---|
| 9,452,448 B2 | 9/2016 | Dettmer |
| 10,537,918 B2 * | 1/2020 | Kringstad .............. B65G 65/32 |
| 2004/0211092 A1 | 10/2004 | Barnes |
| 2010/0012556 A1 | 1/2010 | Pohle |
| 2020/0391952 A1 | 12/2020 | Kringstad |
| 2021/0032041 A1 | 2/2021 | Geywitz |

OTHER PUBLICATIONS https://www.harriston-mayo.com/mayo/equipment/web-belt-sizer-stainless steel/; Mayo Manufacturing Web Belt Sizer Stainless Steel Webpage; Before Nov. 21, 2017.
https://www.vandorensales.com/potato-inspection-grading-equipment; Van Doren Potato Inspection & Grading Equipment Webpage; Before Nov. 21, 2017.

* cited by examiner

CLEANUP CONVEYOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a conveyor for transferring debris that falls from an end dump conveyor to a main incline conveyor.

Sugar beet pilers are used by sugar beet processors during the sugar beet harvest to create large sugar beet piles for temporary storage. The sugar beet piles can reach up to 32 feet high and can hold an average of 120,000 tons of sugar beets in each pile.

A conventional sugar beet piler include one or more end dump units that are adapted to receive the sugar beets from a truck. The term "truck" as used herein also includes vehicle pulled carts and trailers, and any other type of device capable of loading, transporting and unloading sugar beets. Prior to unloading the sugar beets from the truck, the truck is weighed on a scale to get an initial total weight. The initial total weight includes the weight of the truck plus the weight of the sugar beets on the truck along with the weight of the debris in the truck (e.g. debris collected on the sugar beets, debris in the box of the truck).

After being weighed, the truck proceeds onto the end dump unit and unloads the harvested sugar beets onto the end dump unit. Each of the end dump units are connected to an end dump conveyor that conveys the unloaded sugar beets upwardly to a main incline conveyor. The main incline conveyor then conveys the sugar beets to a cleaning unit that removes debris (e.g. dirt, rocks, leaves, vines, waste material, etc.) from the sugar beets. The cleaned sugar beets are then transferred to a main boom conveyor which deposits the sugar beets in a large pile for temporary storage.

During the unloading of the sugar beets by the truck, the debris removed from the load of sugar beets by the cleaning unit is temporarily stored in the cleaning unit until the unloading truck is able to move below a debris return conveyor connected to the cleaning unit that transfers the collected debris back to the truck. After receiving the debris removed from the load of sugar beets, the truck then is weighed again on the scale to get a final total weight (which includes the debris returned to the truck). The weight of the unloaded sugar beets by the truck is calculated by the difference between the initial total weight and the final total weight. The truck then returns the collected debris back to the field prior getting the next load of sugar beets from the sugar beet harvester.

The farmer is typically paid per ton of sugar beets (e.g. approximately $38.30 per ton on average in 2019 in the United States) so accurately calculating the weight of the unloaded sugar beets is important to both the farmer and the sugar beet processor. From the sugar beet processor's perspective it is important to get as much of the debris returned back to the truck prior to the truck getting the final total weight so the sugar beet processor is not paying for the debris dumped by the truck. It is estimated that the amount of debris dumped by a truck is approximately 1,500 to 4,000 pounds depending on harvest conditions (e.g. wet ground results in mud sticking to the sugar beets).

Unfortunately, during the unloading of the sugar beets some debris will fall to the ground from the end dump conveyor (without reaching the main incline conveyor) and is not returned to the truck prior to getting the final total weight resulting in the sugar beet processor paying for the weight of this debris as part of the weight of the unloaded sugar beets. The weight of debris per truck load that falls to the ground from the end dump conveyor is estimated to be approximately 50-200 pounds per truck on a dry harvest year all the way up to approximately 1,000 pounds per truck on a wet harvest year. Considering that numerous truck loads pass through an individual sugar beet piler in a harvest year and some sugar beet processors have over 100 sugar beet pilers in operation, the total financial loss to the sugar beet processor paying for debris that falls from an end dump conveyor can be significant. In addition, the debris that falls from the end dump conveyor has to be periodically cleaned up and removed by employees of the sugar beet processor resulting in downtime for the sugar beet piler and employees.

SUMMARY

Some of the various embodiments of the present disclosure relate to a conveyor that can transfer debris that falls from an end dump conveyor to a main incline conveyor. Some of the various embodiments of the present disclosure include a cleanup conveyor that is attached to an end dump conveyor of a crop piler. The upper run of the cleanup conveyor is positioned below a lower run of the end dump conveyor and is adapted to receive debris that falls from the lower run of the end dump conveyor. The outer end of the cleanup conveyor is near a main incline conveyor of the crop piler to transfer the debris that falls from the lower run of the end dump conveyor to the main incline conveyor of the crop piler. In some example embodiments, the upper run of the cleanup conveyor is parallel with respect to the lower run of the end dump conveyor. In some other example embodiments, the cleanup conveyor is connected to and moved by the end dump conveyor.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different

DETAILED DESCRIPTION

A. Overview

Some of the various embodiments of the present disclosure relate to a conveyor that can transfer debris 11 that falls from an end dump conveyor 40 to a main incline conveyor 30. Some of the various embodiments of the present disclosure include a cleanup conveyor 50 that is attached to an end dump conveyor 40 of a crop piler. The upper run of the cleanup conveyor 50 is positioned below a lower run of the end dump conveyor 40 and is adapted to receive debris 11 that falls from the lower run of the end dump conveyor 40. The outer end of the cleanup conveyor 50 is near a main incline conveyor 30 of the crop piler to transfer the debris 11 that falls from the lower run of the end dump conveyor 40 to the main incline conveyor 30 of the crop piler. In some example embodiments, the upper run of the cleanup conveyor 50 is parallel with respect to the lower run of the end dump conveyor 40. In some other example embodiments, the cleanup conveyor 50 is connected to and moved by the end dump conveyor 40.

B. Crop Piler

Figure 1:
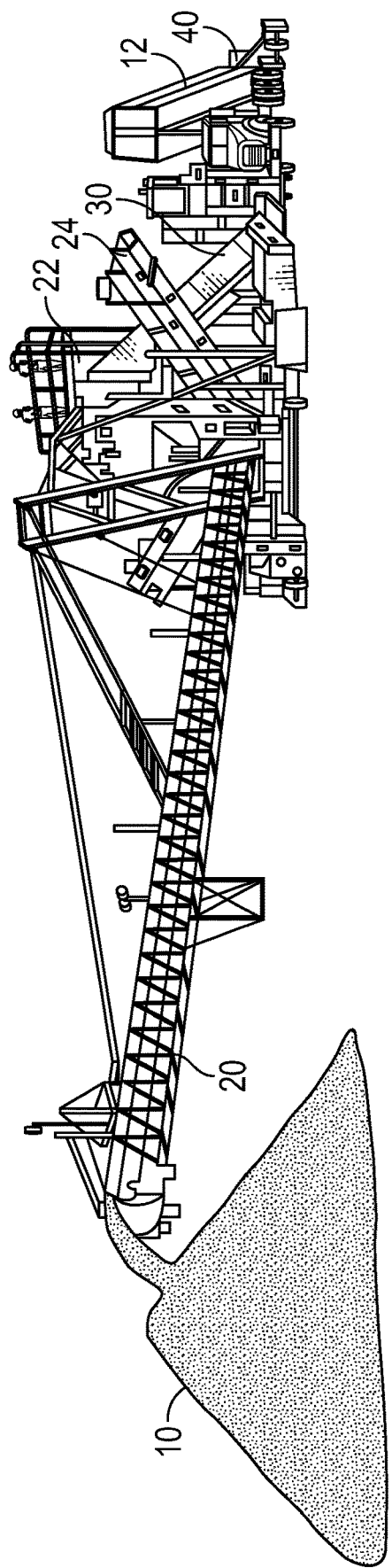
FIG. 1 is a perspective view of a sugar beet piler in accordance with an example embodiment.

FIG. 1 shows illustrates an exemplary crop piler for piling a crop (e.g. sugar beets 10) in a large pile for temporary storage. The term "sugar beets 10" is used for illustrative purposes as to one type of crop the crop piler may be used for, but it can be appreciated that various other types of crops may be used with the crop piler and the disclosure herein should not be limited to crops comprised of sugar beets 10.

Figure 2:
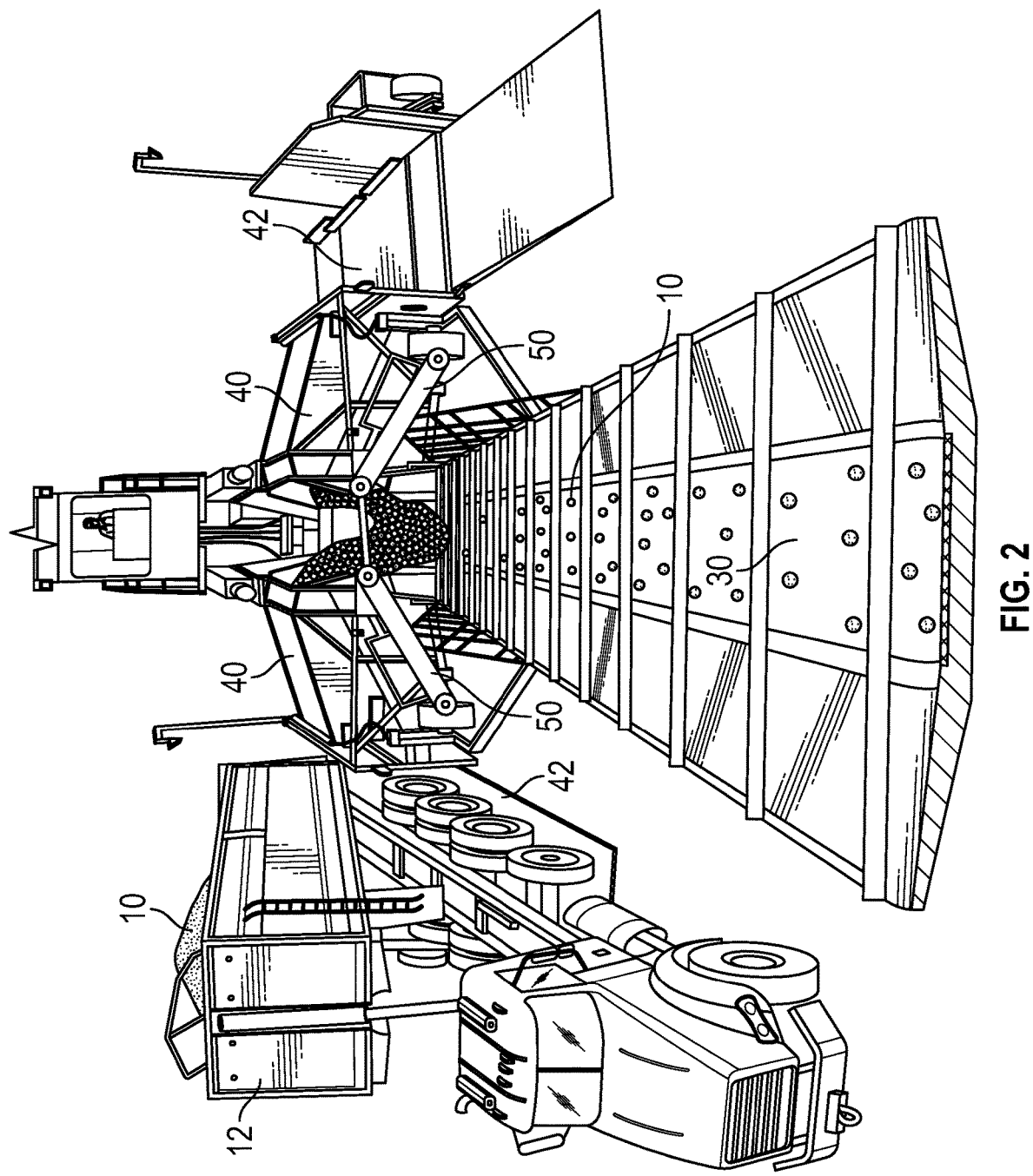
FIG. 2 is a front cutaway view of the main incline conveyor along with two end dump conveyors and two corresponding cleanup conveyors in accordance with an example embodiment.

One exemplary crop piler suitable for use with the various embodiments disclosed is a sugar beet crop piler. A typical sugar beet piler includes one or more end dump units 42 that a truck 12 unloads a load of sugar beets 10 into. FIGS. 1 and 2 illustrate the usage of two end dump units 42 on opposing sides of the main incline conveyor 30. For the purposes of simplicity, the disclosure herein will discuss a single end dump unit 42 and a single end dump conveyor 40 even though the various embodiments disclosed herein may be used with two or more end dump units 42 and conveyors. The term "truck 12" as used herein may include any type of vehicle (e.g. a crop truck 12, semi-truck 12, tractor) or device (e.g. cart, trailer) pulled by a motorized vehicle capable of receiving, transporting and unloading a load of sugar beets 10.

The end dump unit 42 transfers and conveys the unloaded sugar beets 10 from the truck 12 to a main incline conveyor 30 as shown in FIGS. 1 and 2 of the drawings. The end dump unit 42 may have its own separate conveyor or a portion of the main incline conveyor 30 may extend beneath a portion of the end dump unit 42 to receive the load of sugar beets 10. The end dump unit 42 may be a unit that has folding panels that are in a closed state to allow a truck 12 to drive over and an open state to expose the conveyor for the end dump unit 42 for dumping the sugar beets 10 onto.

The main incline conveyor 30 then conveys the sugar beets 10 to a cleaning unit 22 that removes debris 11 (e.g. dirt, rocks, leaves, vines, waste material, etc.) from the sugar beets 10. The cleaned sugar beets 10 are then transferred from the cleaning unit 22 to a main boom conveyor 20 which deposits the sugar beets 10 in a large pile for temporary storage. The debris 11 removed from the sugar beets 10 is stored until the truck 12 is positioned beneath a debris return conveyor 24 where the debris 11 is returned to the truck 12 that unloaded the sugar beets 10.

All of the conveyors discussed and disclosed herein (e.g. a conveyor part of the end dump unit 42, the end dump conveyor 40, the main incline conveyor 30, the main boom conveyor 20, the cleanup conveyor 50, the debris return conveyor 24), may be constructed of various types of conveyors capable of transporting the sugar beets 10 and debris 11 such as, but not limited to, flat-belt conveyors, flat-belt conveyors with rigid cross ribs, troughed belt conveyors, closed belt conveyors, open belt conveyors, metallic belt conveyors, haulage conveyors, bucket conveyors, and various other types of conveyors.

C. End Dump Unit and Conveyor

The end dump conveyor 40 includes an inner end and an outer end opposite of the inner end. The inner end of the end dump conveyor 40 is connected to the end dump unit 42 to receive an unloaded crop (e.g. sugar beets 10) from the end dump unit 42. The outer end of the end dump conveyor 40 is near a main incline conveyor 30 of the crop piler as shown in FIGS. 2, 3A, 3C, 4, 5, 6 and 7. The main incline conveyor 30 may have a side cutout in the sidewall where the main incline conveyor 30 extends through so the sugar beets 10 are not dropped onto the conveyor belt 60 of the main incline conveyor 30 from a height that does not damage the sugar beets 10.

The end dump conveyor 40 is an endless loop conveyor having an upper run and a lower run. The upper run of the end dump conveyor 40 moves towards the outer end of the end dump conveyor 40 and is adapted to transfer a volume of material from the end dump unit 42 to the main incline conveyor 30 of the crop piler as shown in FIG. 3C.

D. Cleanup Conveyor

Figure 3A:
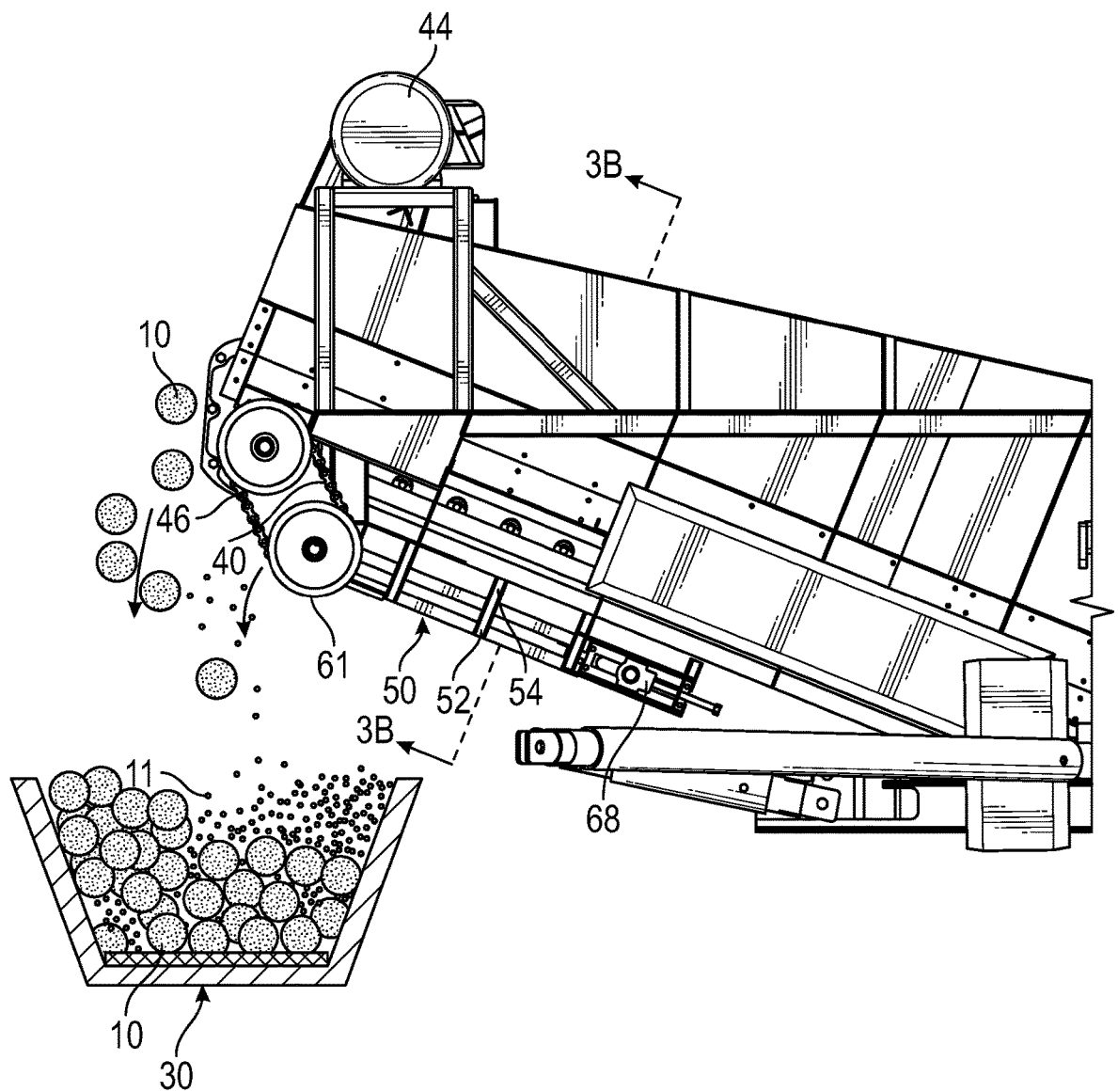
FIG. 3A is a side view of the upper end of the main incline conveyor and the cleanup conveyor dumping sugar beets and debris onto the main incline conveyor in accordance with one example embodiment.
Figure 3B:
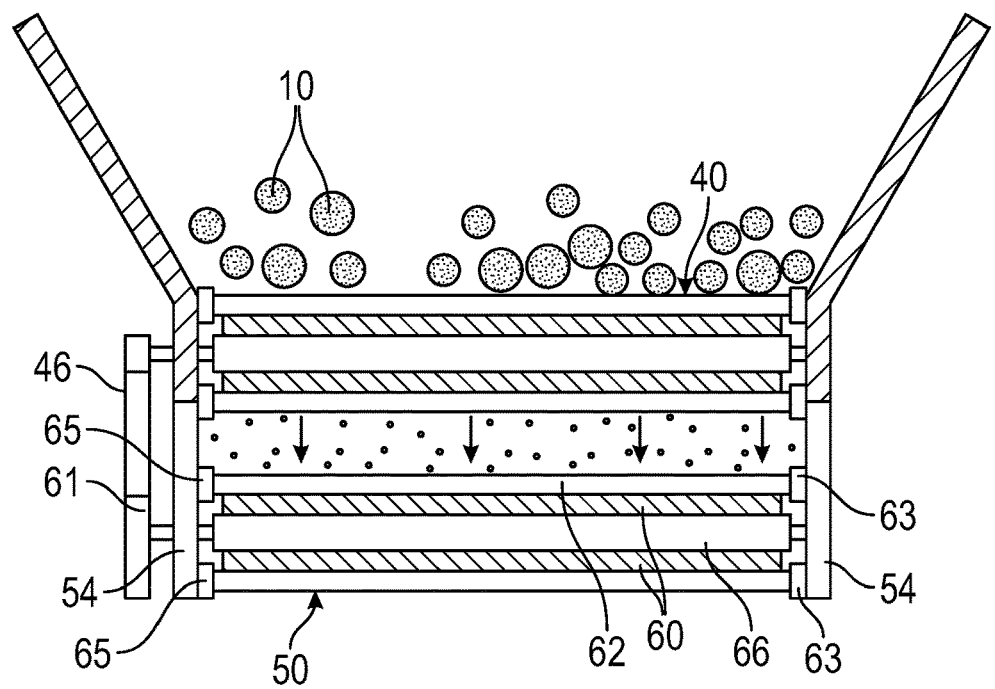
FIG. 3B is a cross sectional view taken along line 3B-3B of FIG. 3A.
Figure 3C:
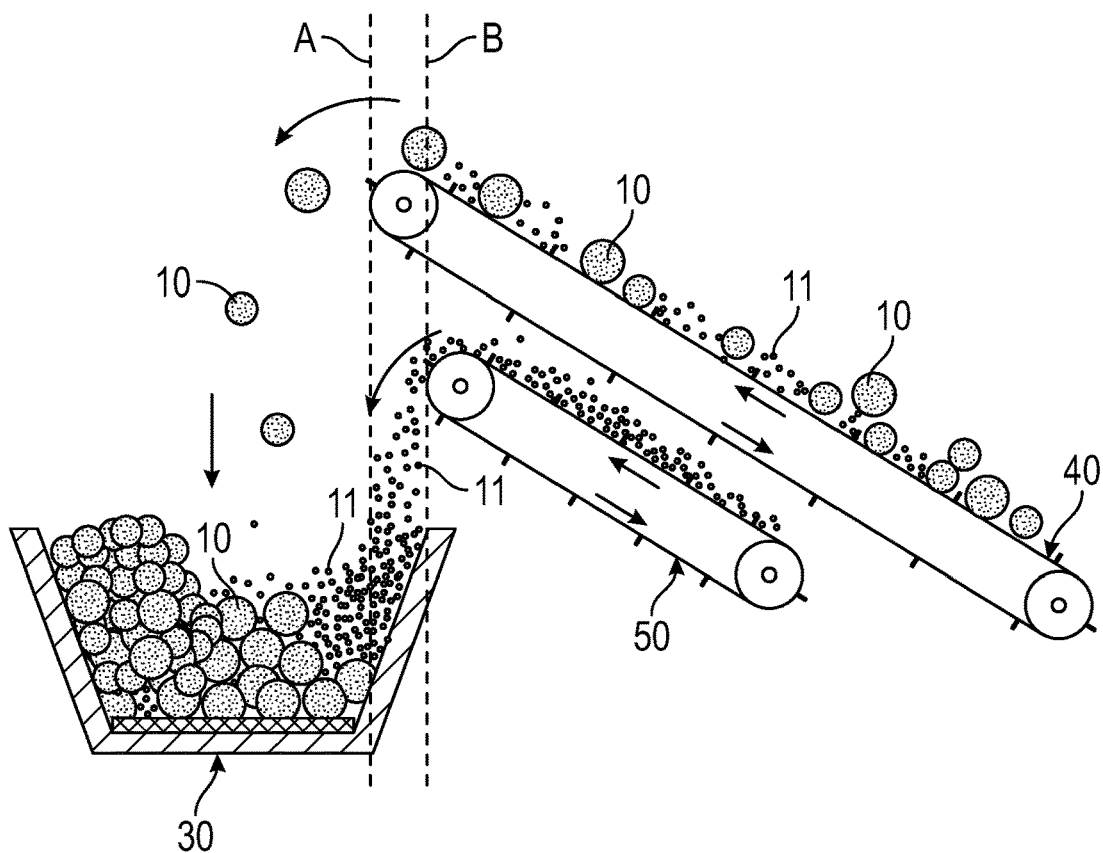
FIG. 3C is a side view of a cleanup conveyor positioned below an end dump conveyor in accordance with an example embodiment.
Figure 4:
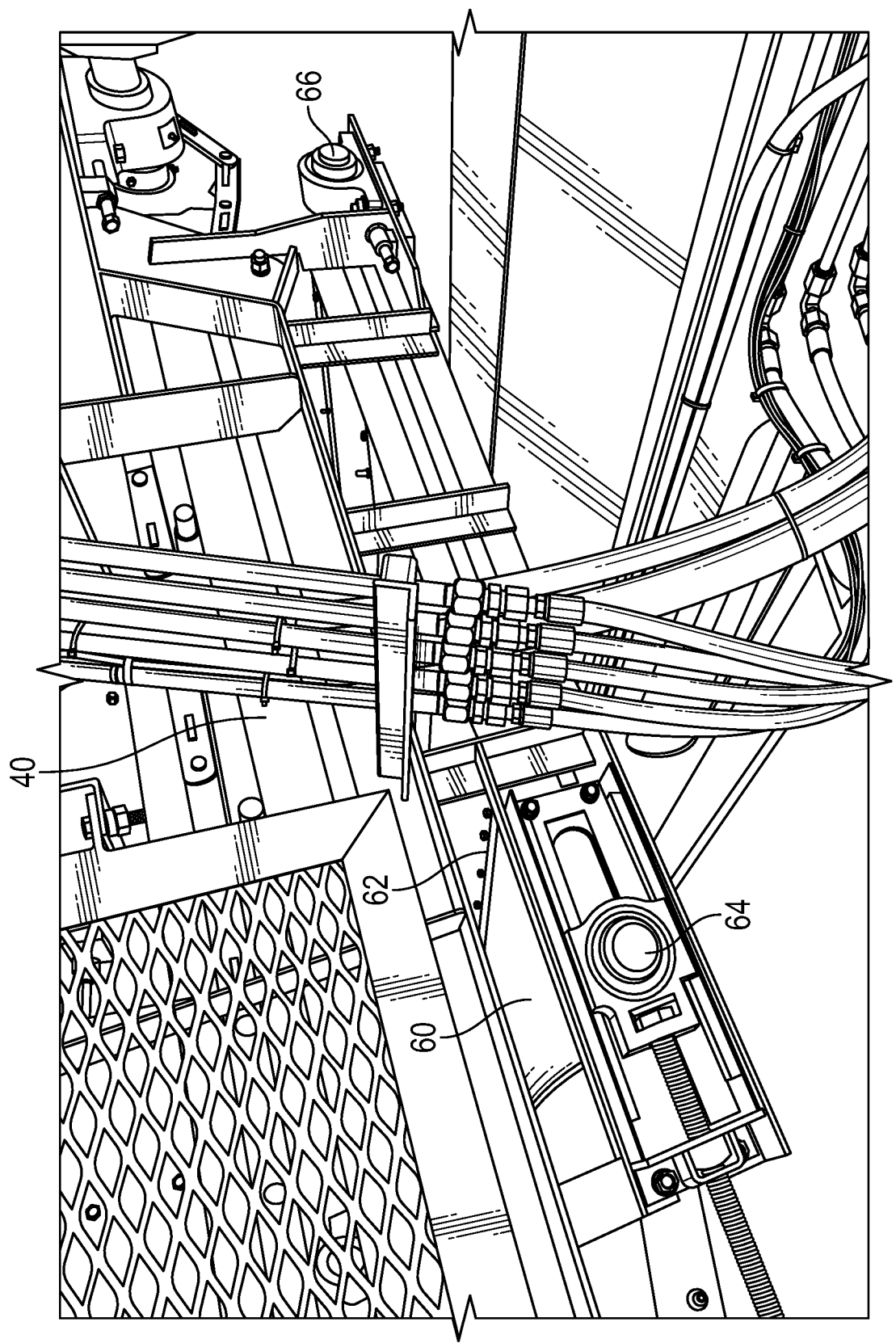
FIG. 4 is a rear perspective view of a cleanup conveyor connected below an end dump conveyor in accordance with an example embodiment.
Figure 5:
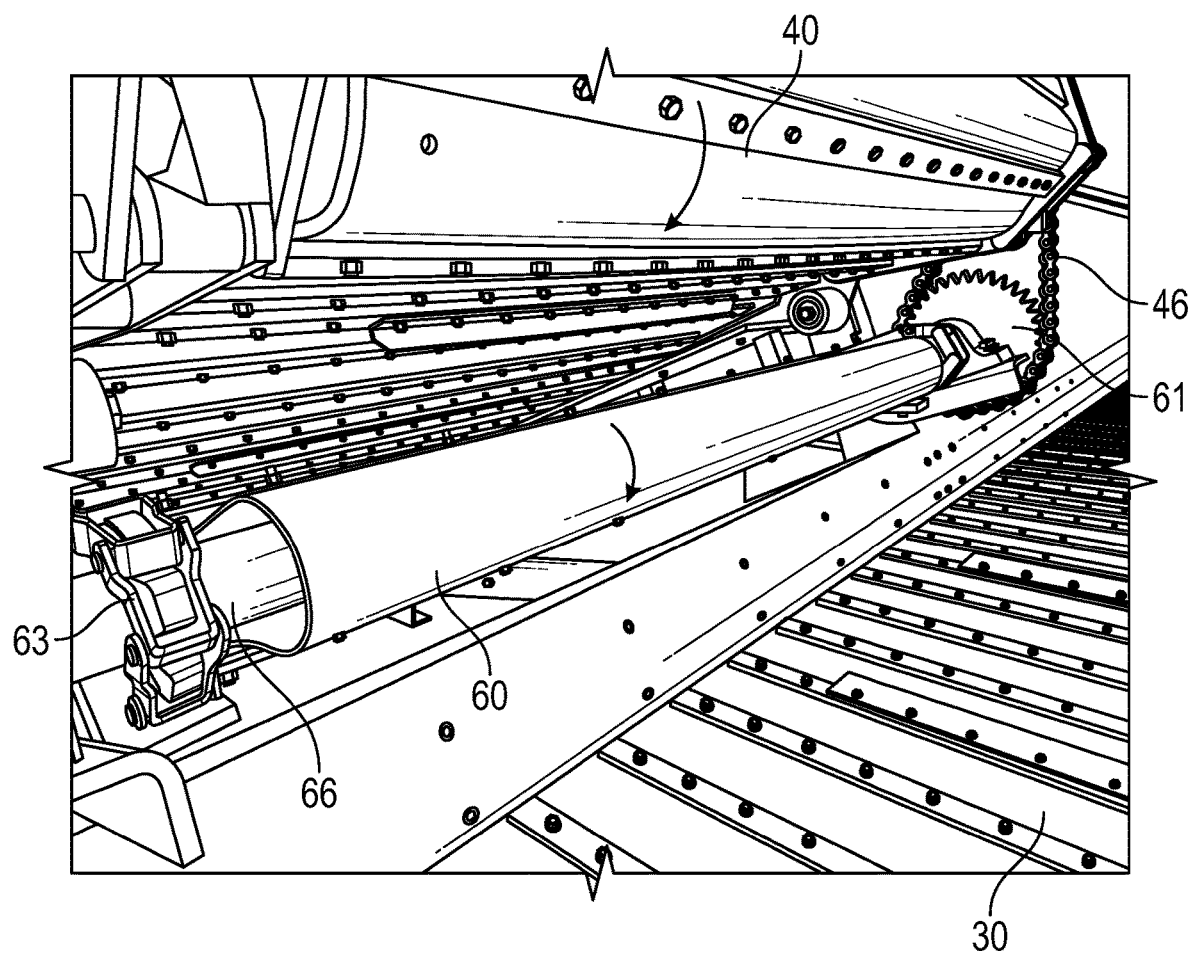
FIG. 5 is a left front end perspective view of a cleanup conveyor connected below an end dump conveyor in accordance with an example embodiment.
Figure 6:
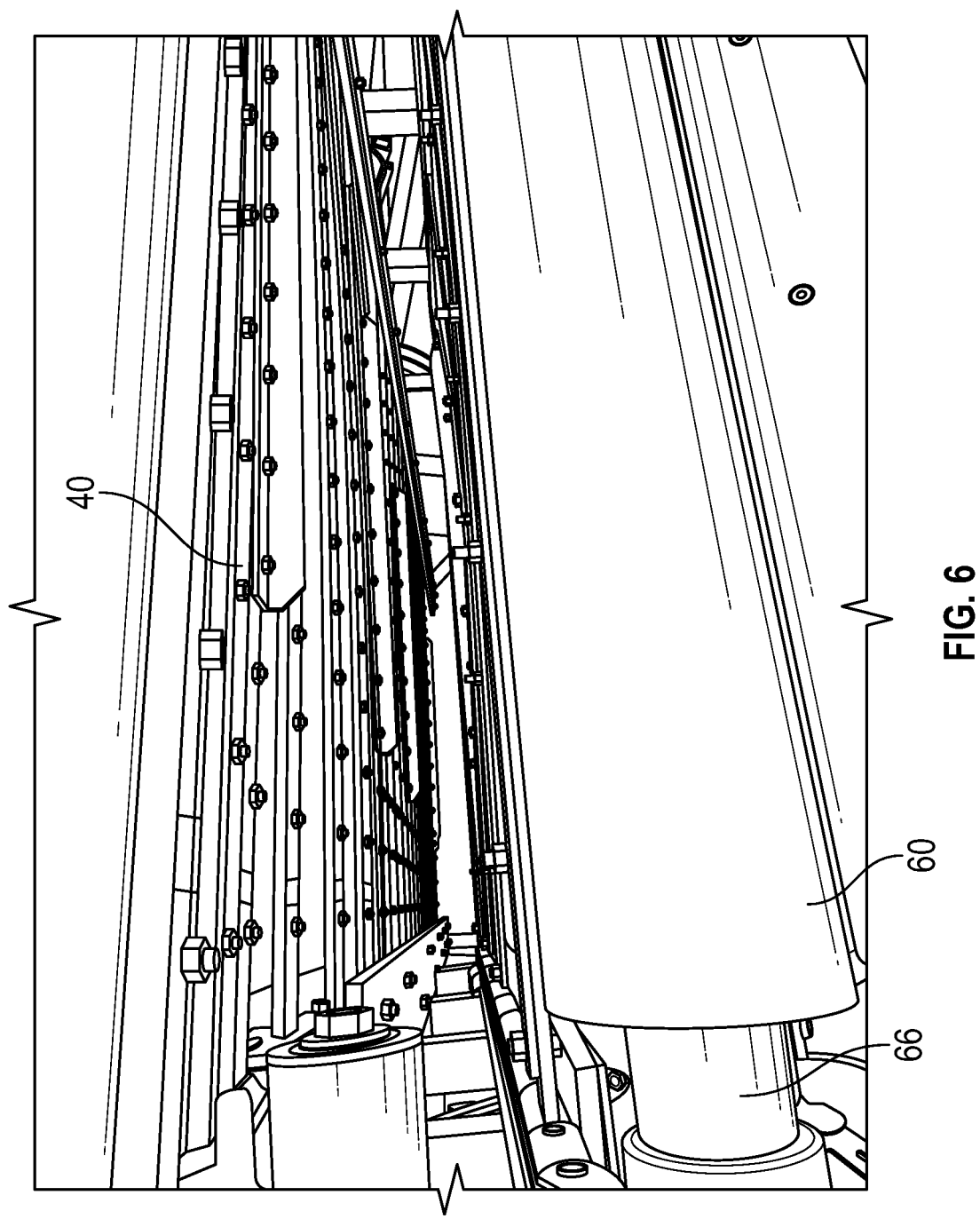
FIG. 6 is a front end view of a cleanup conveyor connected below an end dump conveyor in accordance with an example embodiment.
Figure 7:
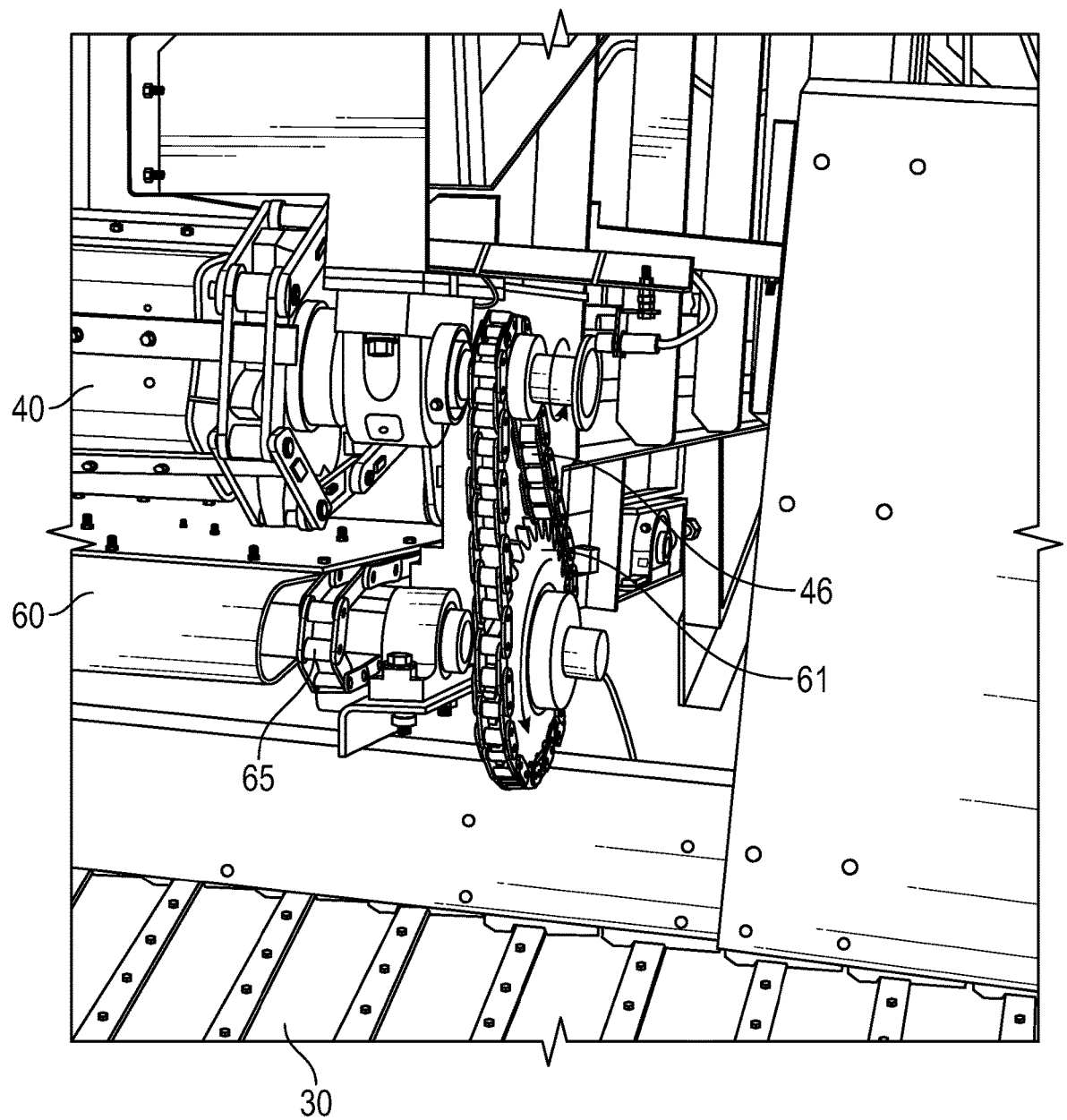
FIG. 7 is a right front end perspective view of a cleanup conveyor connected below an end dump conveyor in accordance with an example embodiment.
Figure 8:
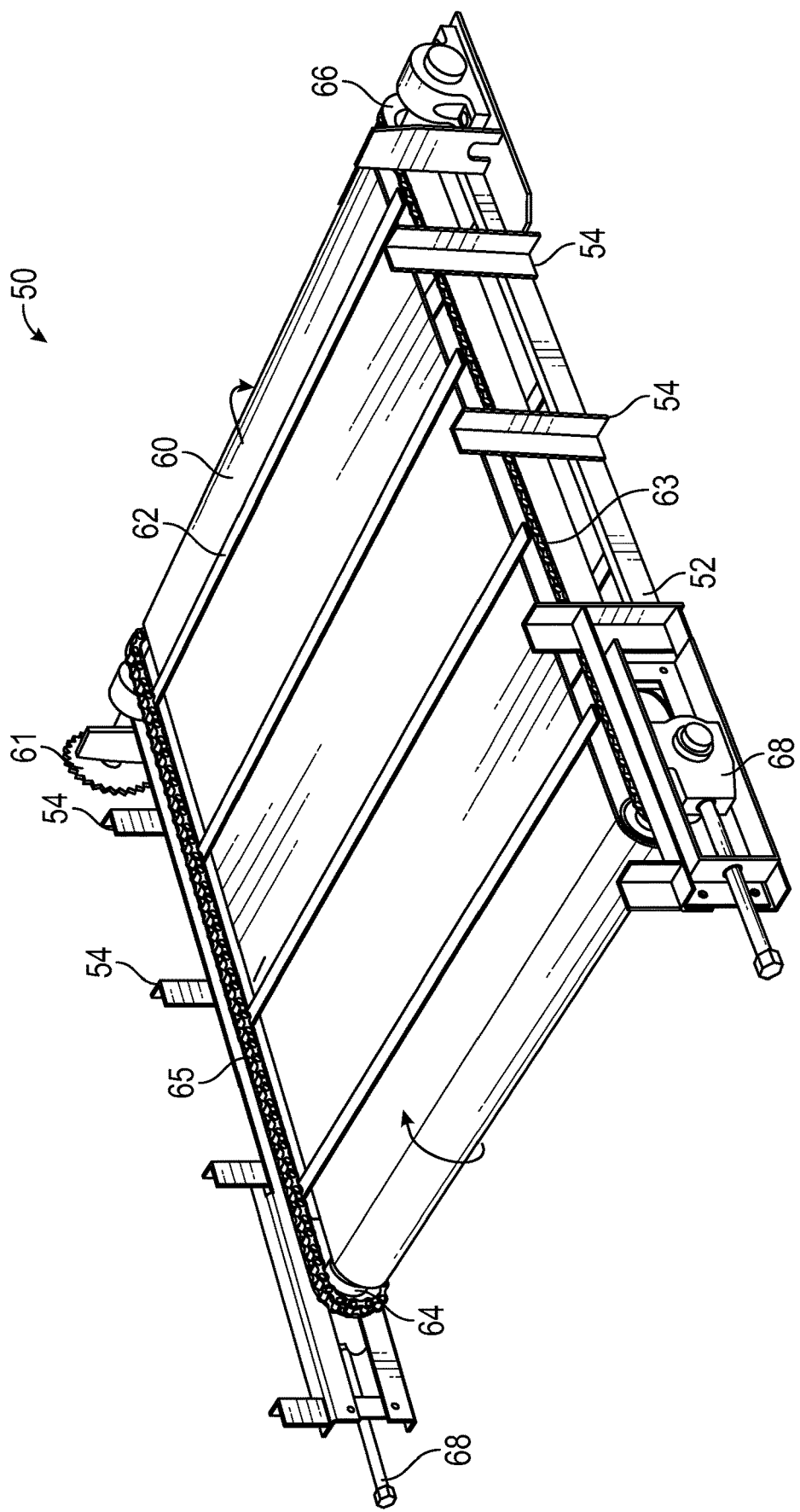
FIG. 8 is a rear upper perspective view of a cleanup conveyor in accordance with an example embodiment.
Figure 9:
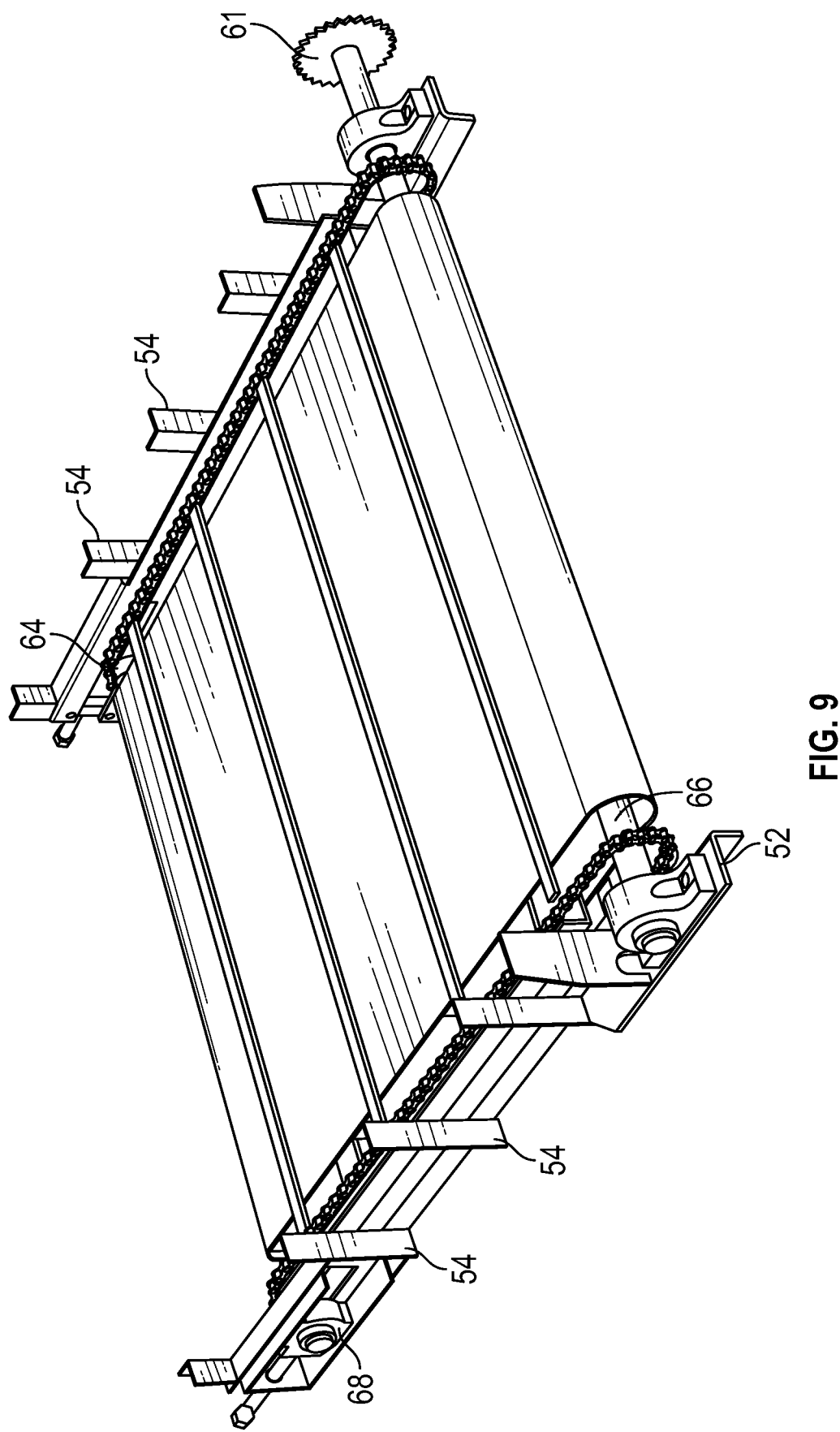
FIG. 9 is a front upper perspective view of a cleanup conveyor in accordance with an example embodiment.
Figure 10:
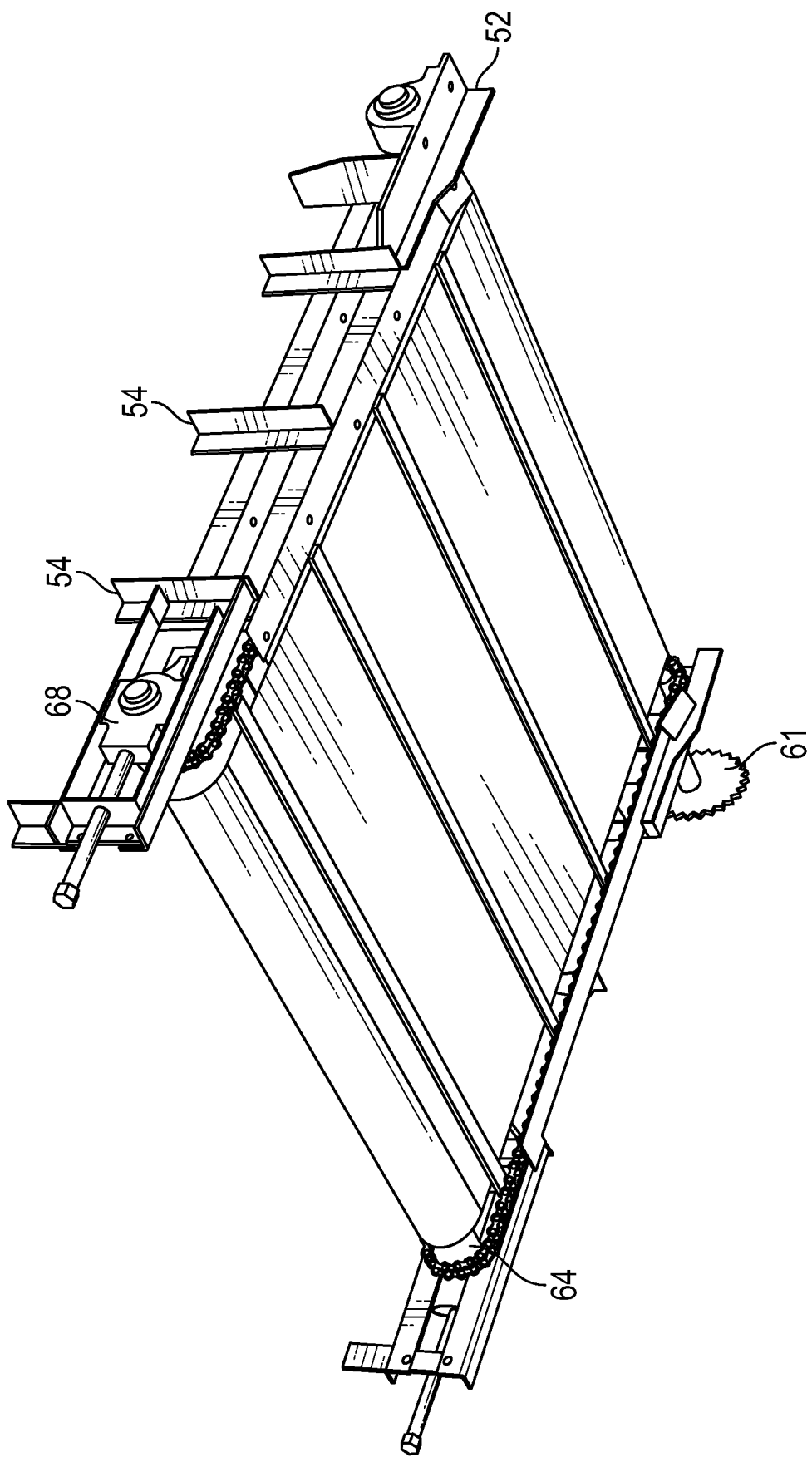
FIG. 10 is a rear lower perspective view of a cleanup conveyor in accordance with an example embodiment.
Figure 11:
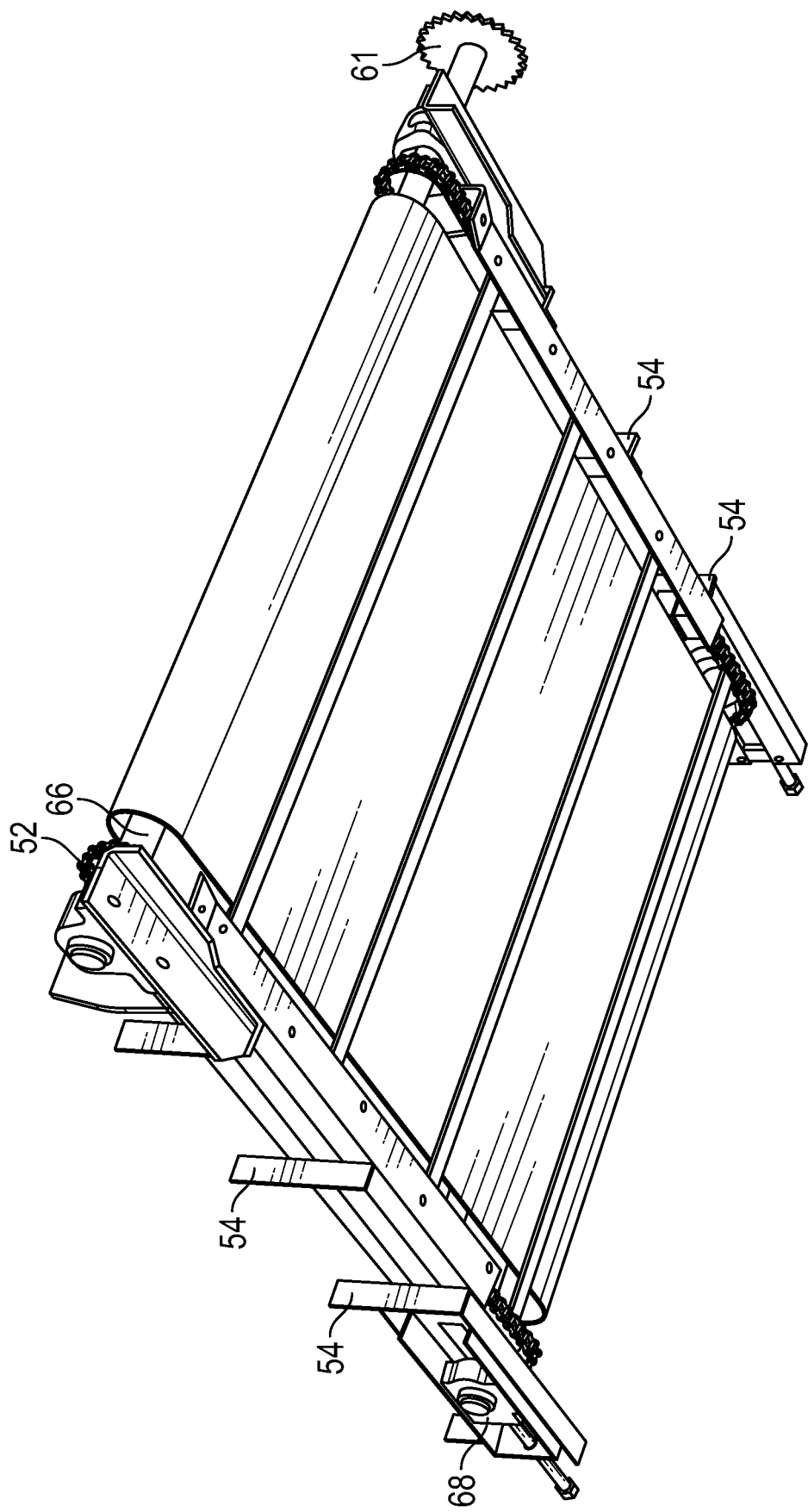
FIG. 11 is a front lower perspective view of a cleanup conveyor in accordance with an example embodiment.
Figure 12:
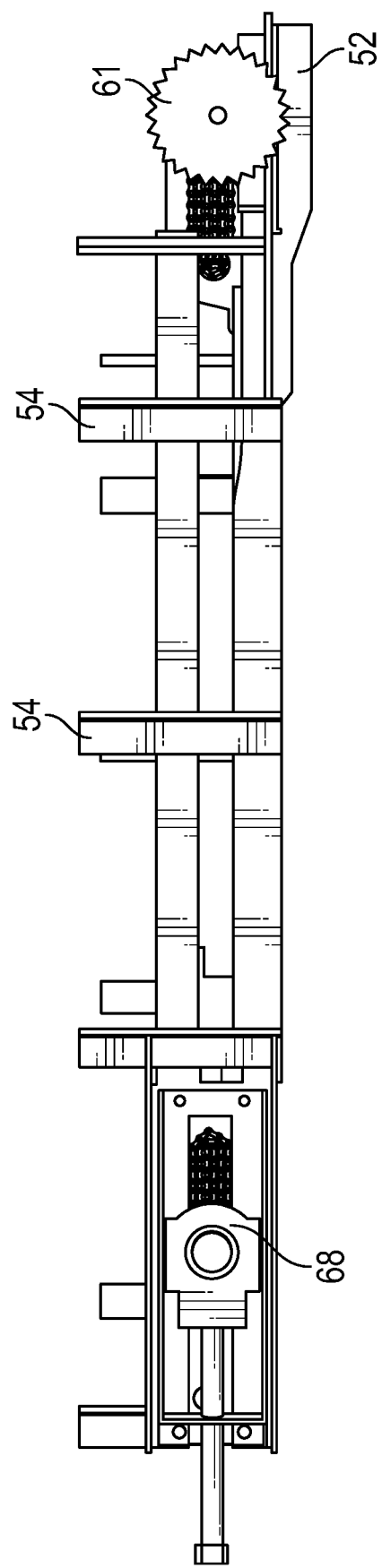
FIG. 12 is a right side view of a cleanup conveyor in accordance with an example embodiment.
Figure 13:
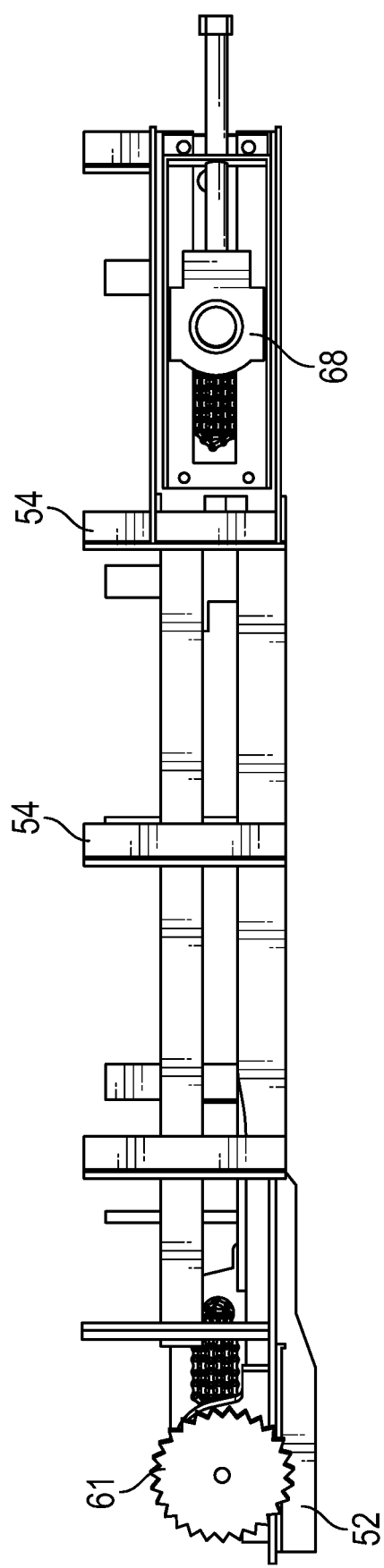
FIG. 13 is a left side view of a cleanup conveyor in accordance with an example embodiment.
Figure 14:
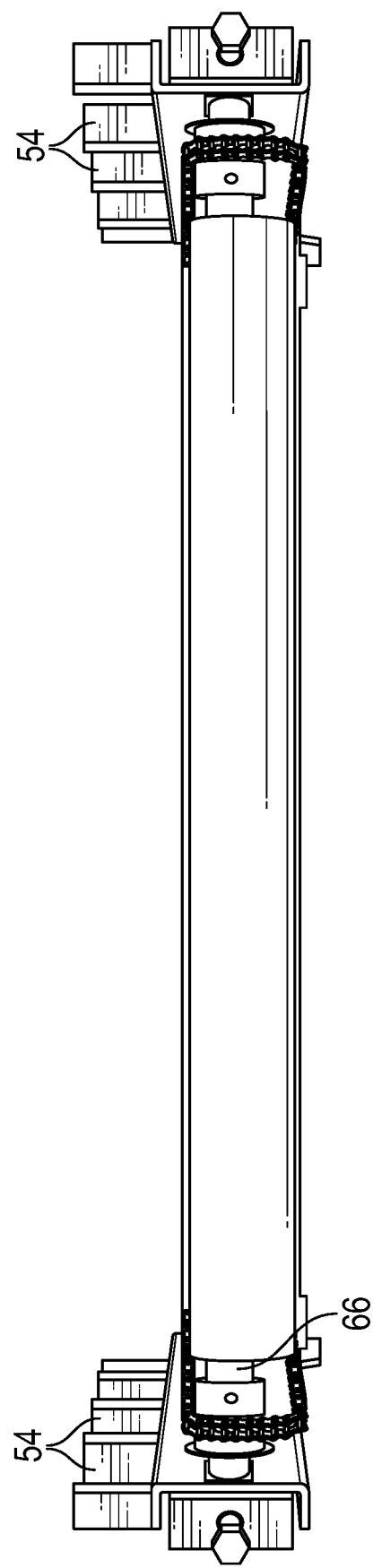
FIG. 14 is a rear end view of a cleanup conveyor in accordance with an example embodiment.
Figure 15:
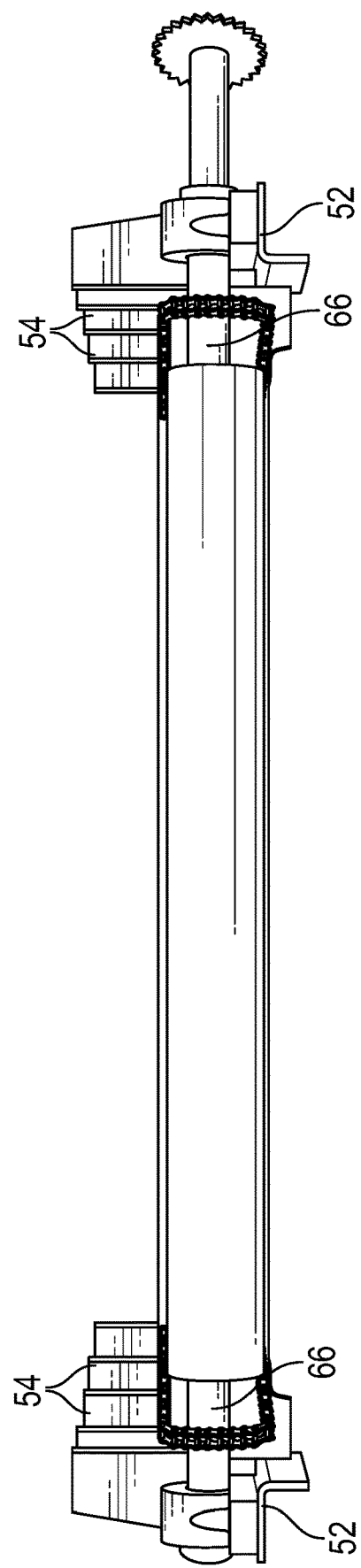
FIG. 15 is a front end view of a cleanup conveyor in accordance with an example embodiment.

The cleanup conveyor 50 is attached to the end dump conveyor 40 and positioned below the end dump conveyor 40 as shown in FIGS. 2, 3A, 3B and 3C of the drawings. The cleanup conveyor 50 has an upper run and a lower run as shown in FIG. 3C of the drawings. In one example embodiment, the cleanup conveyor 50 is attached to and supported below the end dump conveyor 40 as shown in FIGS. 2, 3A and 3B of the drawings. In another example embodiment, the cleanup conveyor 50 is self-standing on a ground surface or is connected to a different portion of the sugar beet piler.

In an example embodiment, the cleanup conveyor 50 is substantially parallel with respect to the end dump conveyor 40 as shown in FIGS. 3A and 3C of the drawings. It can be appreciated that the cleanup conveyor 50 does not need to be parallel with respect to the end dump conveyor 40 and may be at an angle with respect to the end dump conveyor 40. In an example embodiment, the end dump conveyor 40 and the cleanup conveyor 50 are both angled upwardly from their respective inner ends towards their respective outer ends as shown in FIGS. 3A and 3C of the drawings.

Debris 11 sticks to the outer surface of upper run of the end dump conveyor 40 that stays on the outer surface of the end dump conveyor 40 after passing over the outer end of the end dump conveyor 40 and then falls off the lower run of the end dump conveyor 40 due to gravity, vibration and other reasons. As shown in FIGS. 3B and 3C, the cleanup conveyor 50 and the upper run of the cleanup conveyor 50 are positioned directly below the lower run of the end dump conveyor 40 so that the upper surface of the upper run of the cleanup conveyor 50 receives the debris 11 that falls from the lower run of the end dump conveyor 40.

The upper run of the cleanup conveyor 50 moves towards the outer end of the cleanup conveyor 50 towards the main incline conveyor 30 as shown in FIG. 3C of the drawings. While the debris 11 is falling from the lower run of the end dump conveyor 40 onto the upper surface of the upper run of the cleanup conveyor 50, the upper surface of the upper run of the cleanup conveyor 50 transports the received debris 11 to the outer end of the cleanup conveyor 50 where the debris 11 is deposited onto the main incline conveyor 30 to be transported to the cleaning unit 22 of the sugar beet piler as shown in FIG. 3C.

The cleanup conveyor 50 has an outer end and an inner end. In one embodiment, the outer end of the cleanup conveyor 50 is near the main incline conveyor 30 of the crop piler as shown in FIGS. 3A, 3C, 4, 5, 6 and 7 of the drawings. In one example embodiment, the end dump conveyor 40 and the cleanup conveyor 50 are angled upwardly from the end dump unit 42 to the main incline conveyor 30 as shown in FIGS. 2, 3A and 3C.

In one example embodiment, the upper run of the cleanup conveyor 50 is parallel with respect to the lower run of the end dump conveyor 40. It can be appreciated that the upper run of the cleanup conveyor 50 may be at an angle with respect to the lower run of the end dump conveyor 40.

In one example embodiment, the conveyor portion of the cleanup conveyor 50 is connected to and moved by the end dump conveyor 40 instead of having an independent motor. For example, a connecting chain 46 may be used to connect to a drive gear 61 connected to the outer roller 66 (or inner roller 64) of the cleanup conveyor 50 to another gear connected to a roller (outer or inner) of the end dump conveyor 40. In this example embodiment, the drive motor 44 of the end dump conveyor 40 drives and moves both the end dump conveyor 40 and the cleanup conveyor 50. In another example embodiment, a motor is connected to the cleanup conveyor 50 independent of the end dump conveyor 40 where the motor drives the moving conveyor belt 60 or other moving surface of the cleanup conveyor 50.

In one example embodiment, the outer end of the cleanup conveyor 50 is positioned near and below the outer end of the end dump conveyor 40. In another example embodiment, the outer end of the cleanup conveyor 50 is positioned near and below the outer end of the end dump conveyor 40 but the outer end of the cleanup conveyor 50 does not extend outwardly further than the outer end of the end dump conveyor 40. In another example embodiment shown in FIG. 3C of the drawings, the outer end of the cleanup conveyor 50 is positioned near and below the outer end of the end dump conveyor 40 but the outer end of the cleanup conveyor 50 is positioned inwardly with respect to the outer end of the end dump conveyor 40.

In another example embodiment illustrated in FIG. 3C of the drawings, the outer end of the cleanup conveyor 50 is positioned near and below the outer end of the end dump conveyor 40 but the outer end of end dump is aligned with a first vertical plane A and the outer end of the cleanup conveyor 50 is aligned with a second vertical plane B. In one embodiment, the second vertical plane B is not the same as the first vertical plane A. In another embodiment, the second vertical plane B is positioned inwardly with respect to the first vertical plane A as shown in FIG. 3C of the drawings. In another embodiment, the second vertical plane B is positioned closer to the inner end of the end dump conveyor 40 than the first vertical plane A. When the outer end of the cleanup conveyor 50 is positioned inwardly with respect to the outer end of the end dump conveyor 40, there is little risk of the sugar beets 10 being unloaded by the end dump conveyor 40 accidentally hitting the cleanup conveyor 50 which could potentially damage the sugar beets 10.

The upper run of the cleanup conveyor 50 and the lower run of the end dump conveyor 40 are distally spaced apart as shown in FIGS. 3B and 3C of the drawings. In one preferred embodiment, the upper run of the cleanup conveyor and the lower run of the end dump conveyor 40 are distally spaced apart but close together to help provide a compact total height for the conveyors 40, 50. In one example embodiment, the upper run of the cleanup conveyor 50 and the lower run of the end dump conveyor 40 are distally spaced apart less than one foot. In another example embodiment, the upper run of the cleanup conveyor 50 and the lower run of the end dump conveyor 40 are distally spaced apart less than six inches. The space between the upper run of the cleanup conveyor 50 and the lower run of the end dump conveyor 40 may be greater than or less than one foot.

The length of the cleanup conveyor 50 may be greater than, equal to or less than the length of the end dump conveyor 40. In one embodiment, a length of the cleanup conveyor 50 is less than a length of the end dump conveyor 40. In another embodiment, a length of the cleanup conveyor 50 is less than two-thirds of a length of the end dump conveyor 40. In another embodiment, the length of the cleanup conveyor 50 is less than the length of the end dump conveyor 40 and the outer end and the inner end of the cleanup conveyor 50 are both positioned inwardly with respect to the outer end and the inner end of the end dump conveyor 40 respectively.

The cleanup conveyor 50 includes a conveyor frame 52 and a plurality of connecting members 54 extending upwardly from a first side and a second side of the conveyor frame 52 as shown in FIGS. 8 through 15 of the drawings. As shown in FIG. 3A, the plurality of connecting members 54 are connected to a frame of the end dump conveyor 40 with various attachment means (e.g. fasteners, welding, etc.). The conveyor frame 52 of the cleanup conveyor 50 may also be integrally formed within the end dump conveyor 40.

In one embodiment, the cleanup conveyor 50 includes an inner roller 64 near an inner end of the cleanup conveyor 50, an outer roller 66 near the outer end of the cleanup conveyor 50, and an endless conveyor belt 60 (or other type of endless loop conveyor) positioned around the inner roller 64 and the outer roller as shown in FIGS. 8 through 15 of the drawings. The conveyor belt 60 may be a rubber belt, a flat belt, a troughed belt, a metal belt or any other type of conveyor belt structure having an endless loop structure. In one embodiment, the cleanup conveyor 50 may include a plurality of rib members 62 connected to the endless conveyor belt 60 in a crosswise manner to assist in moving the received debris 11 by preventing the debris 11 from falling downwardly along the upper surface of the upper run of the cleanup conveyor 50. In another embodiment, a first chain 63 is connected to the inner roller 64 and the outer roller 66, and a second chain 65 is connected to the inner roller 64 and the outer roller 66. In another embodiment, the plurality of rib members 62 are each connected between the first chain 63 and the second chain 65. Various other endless loop conveyor structures may be used for the cleanup conveyor 50.

In an embodiment shown in FIGS. 4 and 8 through 14 of the drawings, a belt adjuster 68 may be used on opposing sides of the inner roller 64 to adjust the position of the inner roller 64 to tighten or loosen the conveyor belt 60. Various other types of adjustment mechanisms may be used to adjust the tension in the conveyor belt 60.

E. Operation of Example Embodiment

In accordance with one example embodiment, a truck 12 with a load of sugar beets 10 is weighed to get an initial total weight of the truck 12 which includes the truck 12's weight, the weight of the sugar beets 10 and debris 11 within the sugar beets 10. The truck 12 unloads the load of sugar beets 10 (along with the debris 11) onto the end dump unit 42 which are then moved along the end dump conveyor 40 to the main incline conveyor 30 as shown in FIG. 2 of the drawings.

The sugar beets 10 include debris 11 directly attached to the sugar beets 10 or loosely around the sugar beets 10 from the truck 12. A portion of the debris temporarily sticks or is otherwise temporarily attached to the outer surface of the end dump conveyor 40. As the upper run of the end dump conveyor 40 goes around the roller near the outer end of the end dump conveyor 40, the sugar beets 10 are dispersed off the end dump conveyor 40 downwardly toward the main incline conveyor 30 where they are transported to the cleaning unit 22 of the sugar beet piler. The portion of debris 11 that remains on the outer surface of the end dump conveyor 40 eventually falls from the lower run of the end dump conveyor 40 and is received by the upper surface of the upper run of the cleanup conveyor 50 as illustrated in FIGS. 3B and 3C of the drawings. The cleanup conveyor 50 then moves the received debris 11 towards the main incline conveyor and then discharges the debris 11 onto the main incline conveyor 30 where the debris 11 (e.g. dirt, mud, rocks and other waste material) is then transferred to the cleaning unit 22 with the sugar beets 10.

The cleaning unit 22 cleans the debris 11 that remains attached to the sugar beets 10 and removes the loose debris 11 within the sugar beets 10 that is deposited on the main incline conveyor 30 by the end dump conveyor 40 and the cleanup conveyor 50. The cleaned sugar beets 10 are then transported by a main boom conveyor 20 to a large sugar beet pile as shown in FIG. 1. The cleaning unit 22 temporarily stores the collected debris 11 until the truck 12 is repositioned below the debris return conveyor 24 which then conveys the collected debris 11 into the box of the truck 12. When the truck 12 is weighed for a final total weight (i.e. the empty weight), the debris 11 brought to the sugar beet processor from the harvest field is included in the final total weight thereby ensuring that the calculated weight of the unloaded sugar beets 10 (the weight of the unloaded sugar beets 10=the final total weight minus the initial total weight) unloaded by the truck 12 is accurate and does not include the weight of the debris 11 that would have fallen from the end dump conveyor 40. The farmer is therefore paid only for the weight of the sugar beets 10 unloaded and not for the weight of debris 11 that falls from the end dump conveyor 40.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. An end dump system for a crop piler, comprising:
    an end dump unit;
    an end dump conveyor having an inner end and an outer end opposite of the inner end, wherein the inner end of the end dump conveyor is connected to the end dump unit to receive an unloaded crop from the end dump unit, wherein the outer end of the end dump conveyor is near a main incline conveyor of the crop piler, and wherein the end dump conveyor includes an upper run that moves towards the outer end of the end dump conveyor and is adapted to directly transfer a volume of crop items and non-crop debris from the end dump unit to the main incline conveyor of the crop piler; and a cleanup conveyor attached to the end dump conveyor, wherein the cleanup conveyor has an upper run that is positioned directly below a lower run of the end dump conveyor, wherein the upper run of the cleanup conveyor receives non-crop debris that falls from the lower run of the end dump conveyor, wherein the cleanup conveyor has an outer end that is near the main incline conveyor of the crop piler, wherein the upper run of the cleanup conveyor moves towards the outer end of the cleanup conveyor, and wherein the cleanup conveyor directly conveys the non-crop debris that falls from the lower run of the end dump conveyor to the main incline conveyor.

2. The end dump system of claim 1, wherein the crop piler is a sugar beet piler.

3. The end dump system of claim 1, wherein the end dump conveyor and the cleanup conveyor are angled upwardly from the end dump unit to the main incline conveyor.

4. The end dump system of claim 3, wherein the upper run of the cleanup conveyor is parallel with respect to the lower run of the end dump conveyor.

5. The end dump system of claim 1, wherein the cleanup conveyor is connected to and moved by the end dump conveyor.

6. The end dump system of claim 1, wherein the outer end of the cleanup conveyor is positioned near and below the outer end of the end dump conveyor.

7. The end dump system of claim 1, wherein the outer end of the cleanup conveyor is positioned near and below the outer end of the end dump conveyor, wherein the outer end of the cleanup conveyor does not extend outwardly further than the outer end of the end dump conveyor.

8. The end dump system of claim 1, wherein the outer end of the cleanup conveyor is positioned near and below the outer end of the end dump conveyor, wherein the outer end of the cleanup conveyor is positioned inwardly with respect to the outer end of the end dump conveyor.

9. The end dump system of claim 1, wherein the outer end of the cleanup conveyor is positioned near and below the outer end of the end dump conveyor, wherein the outer end of the end dump conveyor is aligned with a first vertical plane, wherein the outer end of the cleanup conveyor is aligned with a second vertical plane, wherein the second vertical plane is not the same as the first vertical plane.

10. The end dump system of claim 9, wherein the second vertical plane is positioned inwardly with respect to the first vertical plane.

11. The end dump system of claim 9, wherein the second vertical plane is closer to the inner end of the end dump conveyor than the first vertical plane.

12. The end dump system of claim 1, wherein the upper run of the cleanup conveyor and the lower run of the end dump conveyor are distally spaced apart less than one foot.

13. The end dump system of claim 1, wherein the upper run of the cleanup conveyor and the lower run of the end dump conveyor are distally spaced apart less than six inches.

14. The end dump system of claim 1, wherein a length of the cleanup conveyor is less than a length of the end dump conveyor.

15. The end dump system of claim 1, wherein a length of the cleanup conveyor is less than two-thirds of a length of the end dump conveyor.

16. The end dump system of claim 1, wherein the cleanup conveyor is comprised of a conveyor frame and a plurality of connecting members extending upwardly from a first side and a second side of the conveyor frame, and wherein the plurality of connecting members are connected to a frame of the end dump conveyor.

17. The end dump system of claim 16, wherein the cleanup conveyor further comprises an inner roller near an inner end of the cleanup conveyor, an outer roller near the outer end of the cleanup conveyor, and an endless conveyor belt positioned around the inner roller and the outer roller.

18. The end dump system of claim 17, wherein the cleanup conveyor further comprises a plurality of rib members connected to the endless conveyor belt in a crosswise manner, a first chain connected to the inner roller and the outer roller, and a second chain connected to the inner roller and the outer roller, wherein the plurality of rib members are each connected between the first chain and the second chain.

19. An end dump system for a crop piler, comprising:

an end dump unit;

an end dump conveyor having an inner end and an outer end opposite of the inner end, wherein the inner end of the end dump conveyor is connected to the end dump unit to receive an unloaded crop from the end dump unit, wherein the outer end of the end dump conveyor is near a main incline conveyor of the crop piler, and wherein the end dump conveyor includes an upper run that moves towards the outer end of the end dump conveyor and is adapted to transfer a volume of material from the end dump unit to the main incline conveyor of the crop piler; and a cleanup conveyor attached to the end dump conveyor, wherein the cleanup conveyor has an upper run that is positioned directly below a lower run of the end dump conveyor, wherein the upper run of the cleanup conveyor is adapted to receive debris that falls from the lower run of the end dump conveyor, wherein the cleanup conveyor has an outer end that is near the main incline conveyor of the crop piler, wherein the upper run of the cleanup conveyor moves towards the outer end of the cleanup conveyor, and wherein the cleanup conveyor is adapted to transfer the debris that falls from the lower run of the end dump conveyor to the main incline conveyor;

wherein the crop piler is a sugar beet piler;

wherein the end dump conveyor and the cleanup conveyor are angled upwardly from the end dump unit to the main incline conveyor;

wherein the upper run of the cleanup conveyor is parallel with respect to the lower run of the end dump conveyor;

wherein the cleanup conveyor is connected to and moved by the end dump conveyor;

wherein the outer end of the cleanup conveyor is positioned near and below the outer end of the end dump conveyor, wherein the outer end of end dump is aligned with a first vertical plane, wherein the outer end of the cleanup conveyor is aligned with a second vertical plane, wherein the second vertical plane is not the same as the first vertical plane;

wherein the second vertical plane is positioned inwardly with respect to the first vertical plane;

wherein the second vertical plane is closer to the inner end of the end dump conveyor than the first vertical plane;

wherein the upper run of the cleanup conveyor and the lower run of the end dump conveyor are distally spaced apart less than one foot;

wherein a length of the cleanup conveyor is less than a length of the end dump conveyor;

wherein the cleanup conveyor is comprised of:
  a conveyor frame;
  a plurality of connecting members extending upwardly from a first side and a second side of the conveyor frame, wherein the plurality of connecting members are connected to a frame of the end dump conveyor;
  an inner roller near an inner end of the cleanup conveyor;
  an outer roller near the outer end of the cleanup conveyor,
  an endless conveyor belt positioned around the inner roller and the outer roller;
  a plurality of rib members connected to the endless conveyor belt in a crosswise manner;
  a first chain connected to the inner roller and the outer roller;
  a second chain connected to the inner roller and the outer roller, wherein the plurality of rib members are each connected between the first chain and the second chain.

\* \* \* \* \*